United States Patent [19]

Kaldenbach

[11] Patent Number: 4,466,345
[45] Date of Patent: Aug. 21, 1984

[54] APPARATUS FOR PRESSING AND BINDING BALES OF REFUSES

[75] Inventor: Erwin Kaldenbach, Ratingen, Fed. Rep. of Germany

[73] Assignee: Lindeman Maschinenfabrik GmbH, Dusseldorf, Fed. Rep. of Germany

[21] Appl. No.: 454,643

[22] Filed: Dec. 30, 1984

[30] Foreign Application Priority Data

Jan. 25, 1982 [DE] Fed. Rep. of Germany ....... 3202233

[51] Int. Cl.³ .......................................... B65B 13/02
[52] U.S. Cl. .................................. 100/19 R; 100/3; 100/31
[58] Field of Search .................. 100/3, 19 R, 24, 31

[56] References Cited

U.S. PATENT DOCUMENTS 4,167,902  9/1979  Bister ...................................... 100/3

FOREIGN PATENT DOCUMENTS 2441485  7/1980  France .................................. 100/31

Primary Examiner—Billy J. Wilhite
Attorney, Agent, or Firm—Toren, McGeady and Stanger

[57] ABSTRACT

A machine for pressing and binding bales (6) of refuse with wire is provided with a binding mechanism comprising a wire cutting device (14), a wire twisting device (13) and a binding needle (19) which is movable across a rear face of the bale for forming a wire loop (8a, 8b), a part of which is joined by the twisting device (13) to the tail end (8c) of a previously formed loop of wire to form a band extending around the bale. In order to avoid waste of wire occurring in the binding of over-length bales and to ensure functionally reliable and trouble-free binding of the bales, the binding needle (19) together with the wire loop (8a 8b) are capable of being transported parallel to the pressing direction (P) until they are adjacent the position adoped by the twisting device (13).

10 Claims, 11 Drawing Figures

APPARATUS FOR PRESSING AND BINDING BALES OF REFUSES

This invention relates to machines for pressing and binding bales of refuse, for example waste paper, comprising a pressing box, a pressing plunger movable therein, a binding device for binding bales pressed in the pressing box with wire, the device including a wire cutting and twisting device, and a binding needle which is movable along a rear face of the bale for forming a wire loop beyond the bale face on which twisting of the wire is to be carried out, the wire loop being formed from wire extending from a rearwardly situated storage roll and leading over an opposite longitudinal face of the bale and over the front face of the bale and the binding device further including means for the longitudinal conveyance of the wire in the pressing direction into the twisting position.

Such a machine is disclosed in German Patent Specification No. 2 105 163. This machine produces so-called single-wire binding, in which the wire which has its free end upstanding in front of the bale and passes backwards beneath the bale to the storage roll is first raised to above the upper edge of the bale by a binding needle which is movable along a rear face of the bale. The length of the wire loop produced in this way is adjustable by a facility for preselecting the length of the stroke of movement of the binding needle. The thus formed wire loop can have a wire length, in the region projecting above the top face of the bale, which is approximately twice the length of the bale. This measure is necessary to enable excessively long bales to be bound satisfactorily with wire. By means of a pivotal clamping and cutting device which is movable in the axial direction, the end of the raised wire loop associated with the rear face of the bale is firmly clamped and cut. The clamping and cutting device then pivots the fixed end of the wire, forming a crossing point alongside the free end of the wire which is held by a magnetic holder. At this position, twisting together of the two ends of the wire then takes place using an axially upwardly and downwardly moving twisting device which is operated from above.

The use of this known machine involving the above technique is accompanied by some disadvantages in regard to the binding of excessively long bales, such as can occur, for example, in the pressing of non-homogeneous material which varies widely in its density and compressibility. Owing to the various difficulties and necessary handling operations described below with the above known binding machine, trouble-free binding of the bales is not always assured. One disadvantage arises, for instance, from the circumstance that the end of the wire loop associated with the rear face of the finished pressed bale must be cut by a cutting device and be conveyed away from the binding needle by means of a clamping apparatus into the twisting position. This clamping or transfer apparatus introduces an additional factor of uncertainty into the known binding machine, because the wire end to be taken over is not always held correctly aligned and positioned in the binding plane and is not always correctly tensioned on account of distortions of the wire, so that in this respect difficulties can occur in the transfer.

To enable this problem which arises with excessively long bales to be overcome with the known binding machine, the wire end passing over the front face of the bale must be made sufficiently long before each binding operation for even the longest bale produced still to be capable of being bound with wire. This measure is necessary in order that the free end of the wire, independently of the length of the bale which is produced, may be sufficiently long for it to be crossed always at the same point, namely in the twisting plane, with the wire end raised at the rear face of the bale by means of the binding needle and then to be cut by the cutting device. Otherwise binding would not be possible, because the twisting device, which can be moved axially up and down, is fixed in position relative to the twisting plane and always comes into action at the same point. In the case of a bale of normal or even short length, as is most frequently produced during a sequence of operations, the wire end intended for the maximum length of bale is only partly required for the binding of the bale, so that a considerable wastage of wire takes place in the binding of bales in this manner.

Added to this is the fact that the binding needle, when a bale of excess length is produced, must be raised sufficiently high for the wire loop formed to have a length equal to twice the length of the bale, and for this purpose the binding needle must have a correspondingly long stroke. This long stroke results in a relatively long duration for one working cycle of the machine and a correspondingly large height for the pressing and binding machine and consequently also of the building in which the machine is housed. This results in uneconomic construction costs. Since the length of the wire end, which is conducted past the front face of the bale, is always a residual product of the preceding binding operation, i.e. of the length of the stroke of the binding needle which is adapted to the length of the preceding bale, accurate metering of the wire to suit the particular bale length to be bound is simply not possible with the known machine.

The object of the present invention therefore is to improve the type of machine initially described so that the wastage of wire occurring during binding of excessively long bales is avoided and a functionally reliable and troublefree binding of the bales is achieved.

To this end, according to this invention, in a machine as initially described the binding needle together with the wire loop have a mechanism by which they are moved parallel to the pressing direction until they are opposite the adopted position of the twisting device. With a binding device constructed in this manner, bales of excess length can be automatically bound without problems occurring and without wire wastage. The purpose of the binding needle which can be moved parallel to the pressing direction is to convey the length of wire which passes beneath the lower face of the bale and is pulled upwards to form a wire loop, to a level above the upper face of the bale and to bring the wire to the position adopted by the free end of the wire held at the twisting device, where twisting of the two wire ends together then takes place.

According to a further preferred embodiment of the invention, a still more flexible adaptation of the machine to different bale lengths is made possible by the twisting device being displaceable in a direction parallel to the pressing direction. The twisting device adopts, for a bale of normal length, a fixed basic position approximately at the centre of the length of the bale. By contrast, when a bale of excess length is produced, the device is moved from its basic position in the pressing direction together with the length of wire extending from the front face of the bale through a distance which is determined by the length of the material pressed beyond the normal bale length. By this mobility of the twisting device, relative movements between the length of wire bearing against the lower face and front end face of the bale and the bale itself, and also overloading of the twisting device due to tensile forces transmitted by the wire, are avoided when binding bales of excess length.

A preferred feature for aligning the lengths of wire participating in the twisting operation consists, in a further embodiment of the invention, in that a guide is disposed on the binding needle at a distance beneath a wire-capturing hook of the needle, the guide being vertically aligned with the hook.

This results in an especially functionally reliable form of construction and guidance, in which the wire can be conveyed with positive guidance over the upper side of the bale into the twisting position. The conveyance of the length of wire into the twisting position is with advantage promoted and facilitated by a guide groove formed in the tip of the binding needle. This groove permits or effects additional centering of the length of wire during its conveyance above the upper face of the bale.

For optimum execution of the twisting operation, it is important that the lengths of wire being twisted together shall be held oriented as upright as possible in the binding plane, so that they may be seized by the twisting device. According to an advantageous further feature of the invention, therefore, the binding wire which faces towards the twisting device is guided, at least in the twisting position, between the wirecapturing hook, guide and tip of the needle axially parallel to the other length of wire with which the first length of wire is to be twisted, so that the twisting device can receive the wire without difficulty and no additional delay or mechanical hindrance occurs in the steps of the twisting operation.

After completion of one twisting operation and cutting of the twisted-together lengths of wire by the cutting device, the binding needle, which has been moved to the position adopted by the twisting device, remains at this position until the separated length of wire wrapped around the hook has been pulled off the hook by a newly produced bale and has been moved together with the new bale in the pressing direction by still further succeeding bales. In order to ensure better guidance of this length of wire extending from the front face of the bale into the twisting position again to be adopted, and in order to facilitate the longitudinal conveyance of the wire over the upper face of the bale, it is advantageous for the length of wire extending from the front face of the bale to be held by at least one clamping piece, by which vertical alignment of the length of wire in the binding plane and in the twisting position can simultaneously be effected. This facilitates the introduction of the length of wire into the twisting device.

An example of a machine in accordance with the invention is illustrated somewhat diagrammatically in the accompanying drawings in which.

Figure 1:
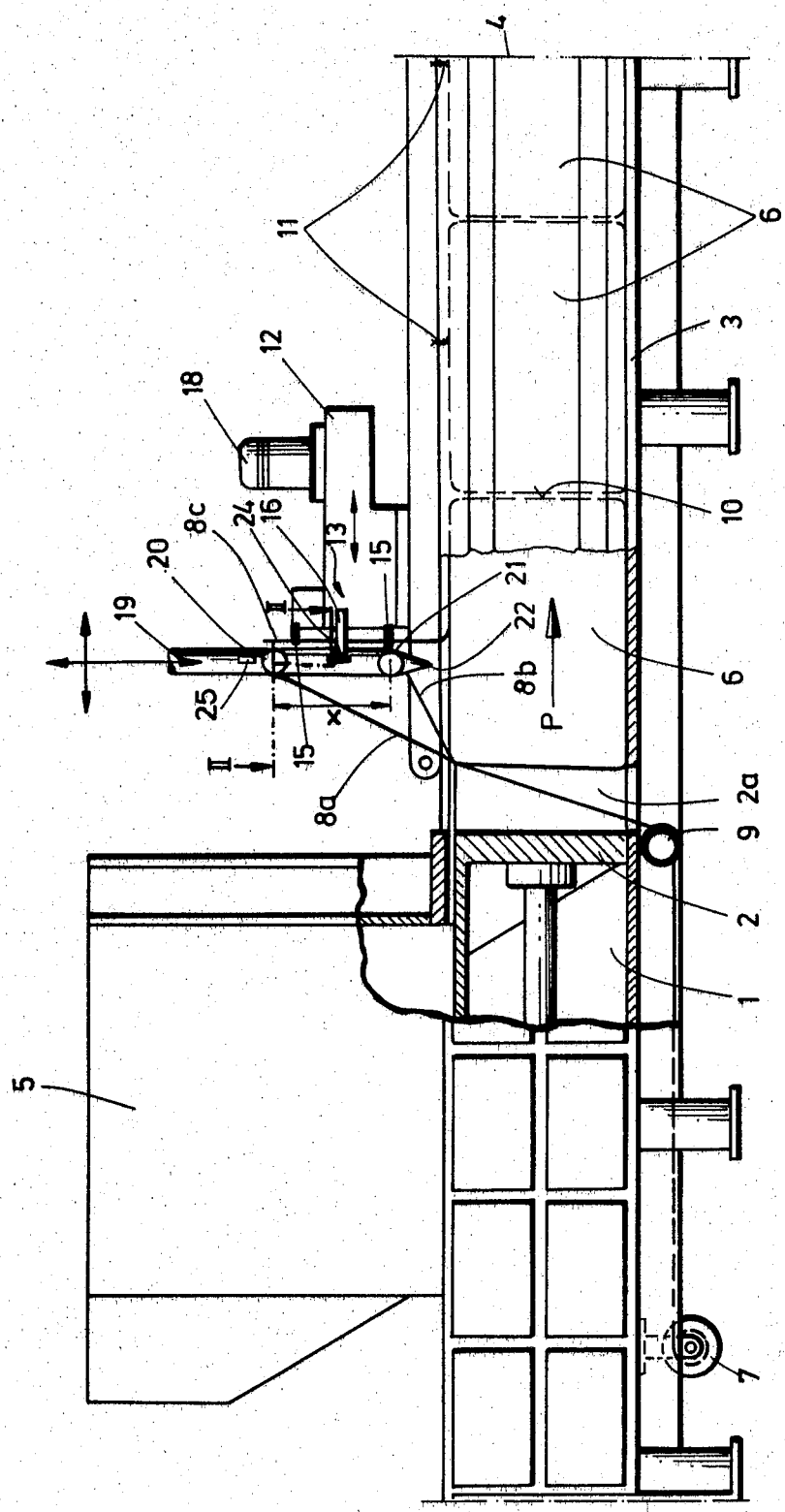
FIG. 1 is a side view of the machine with a small part shown in section.

The baling press comprises a rectangular pressing box 1, with pressing plunger 2 and a plunger drive, which is not illustrated. The pressing box 1 is adjoined by a pressing channel 3, the cross-section of which decreases to a small extent in a direction from the pressing box 1 towards an outlet opening 4, in order to produce a desired resistance to movement of pressed bales along it. For this purpose at least one wall of the pressing channel 3 is adjustable in inclination to the opposite wall. A filling shaft 5 leads from above into the pressing box 1 and material to be pressed is charged through the shaft into the box. To produce each bale, a number of working strokes of the pressing plunger 2 are required in a pressing direction P indicated by the arrow, more material being charged into the box each time the plunger 2 is retracted. In the view shown in FIG. 1, three pressed bales 6 are already situated in the pressing channel 3, of which the central and right hand ones have already been bound with wire, while the left hand one is ready for binding. The initially free end 8c of a wire 8 passes from a lower storage roll 7 beneath the pressing box 1 under a guide roller 9 and around a forward end face 10 of the bale just about to be bound. The free end 8c is connected at a twist 11, which is eventually positioned at the upper face of the bale when binding is completed to the end 8b of a preceding length of the wire, which results from the cutting of a raised wire loop 8a, 8b. The production of the twisted connection will be subsequently described.

A housing 12 is mounted on the channel 3 so that it is movable to and fro on rails, not illustrated, in directions indicated by a double-headed arrow in FIG. 1.

Figure 2:
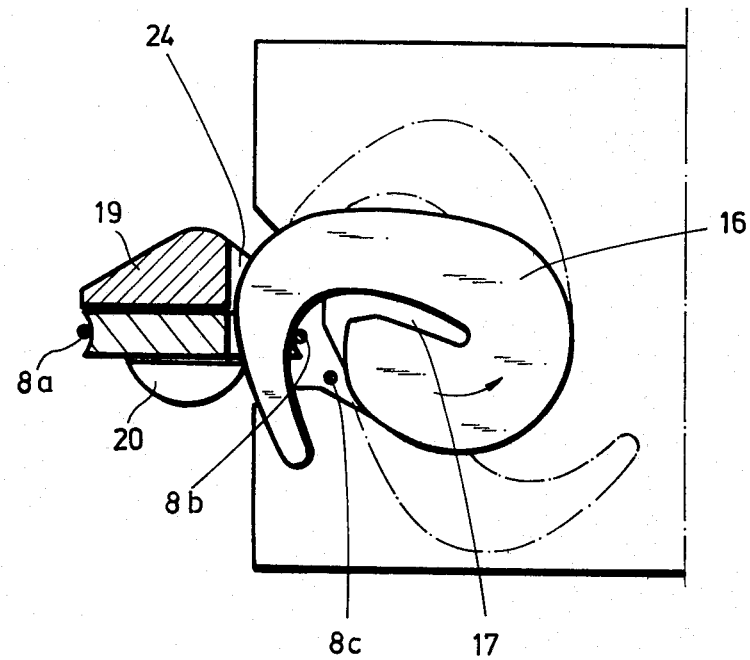
FIG. 2 is a section to a larger scale on the line II—II of FIG. 1 showing in plan a disc, which forms part of the twisting device, during a twisting operation, and showing also the association of the disc with the binding needle.

The housing 12 forms a support for a twisting device 13 and a cutting device 14 and, in the example illustrated, also forms a support for two clamping pieces 15, which are disposed above and below the twisting device 13 and by means of which the free end 8c of a wire extending from the front end face 10 of the bale is held clamped vertically under tension in the plane in which the bale is being bound. The twisting device 13 is shown in FIG. 1 already moved into its operating position. The device 13 comprises as shown in FIG. 2, amongst other things, a twisting wheel 16 which has a slit 17 and rotated at certain times by a motor 18 via intermediate gearing, which is not shown. After completion of the twisting operation, the cutting device 14, which can be swung into the binding plane and is situated above the twisting device 13 comes into action, cutting the twist 11 or cutting the twisted together wires 8b and 8c above the twist point 11.

A binding needle 19, which is movable up and down along its axis, is provided with a wire-capturing hook 20, which is disposed at a distance X above a guide 21, which is aligned vertically beneath the hook. The hook 20 is in the form of a roller as can be seen in the drawings. In the present example the guide 21 is a guide roller mounted on the needle 19 (see FIG. 9). By this arrangement, as is explained in more detail later, the conveyance of the wire loop 8a, 8b with the binding needle 19 above the upper face of the bale being bound is substantially facilitated. In addition, by the guiding of the wire length 8b parallel to the axis of the needle 19 between the hook 20 and guide roller 21, vertical alignment of the wire length 8b in the binding plane is assured. This subsequently makes possible the twisting together of the wire length 8b with the free wire end 8c. The tip 22 of the needle 19 is moreover provided with a guide slit 23, to facilitate the guiding and conveyance of the wire length 8b over the upper face of the bale into the twisting position. In order that the twisting device 13 may seize satisfactorily the wire length 8b to be twisted and without colliding with the shaft of the binding needle, a groove 24 is formed in the shaft of the needle, as can be seen from FIGS. 1 to 8 and FIG. 9, so that the twisting wheel 16 can move during the operation, through the groove 24 and engage behind the wire length 8b which is to be twisted together with the wire length 8c (FIG. 2).

Figure 10:
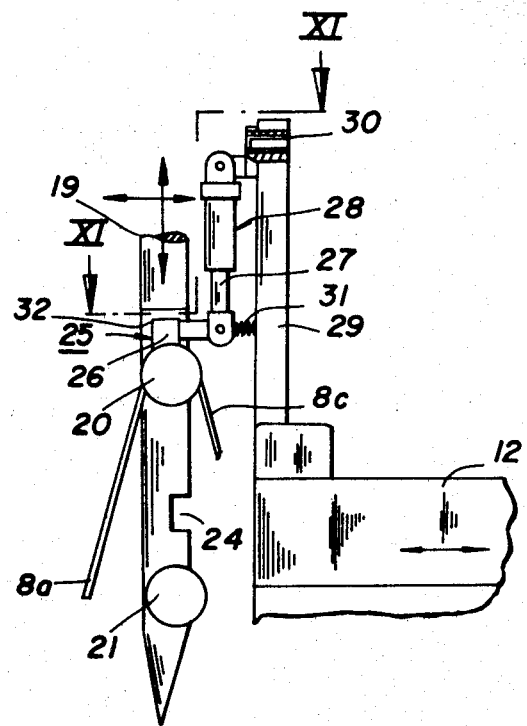
FIG. 10 is an enlarged detail of the holding element and its hydraulic actuating mechanism.
Figure 11:
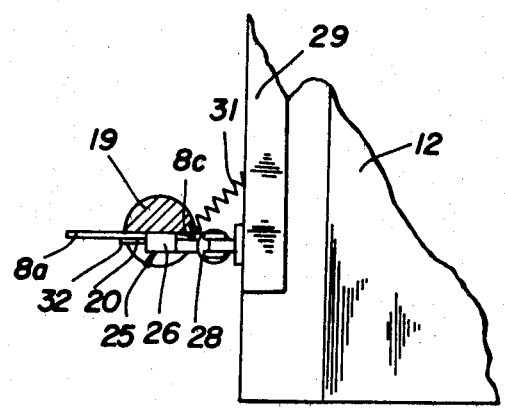
FIG. 11 is a sectional view taken along line XI—XI in FIG. 10.

Moreover, a holding element 25 is mounted on the movable housing 12 as shown in FIGS. 10 and 11. Holding element 25 includes a shoulder piece 26, which acts directly on the wire and clamps it on the hook 20. The shoulder piece 26 is connected with the piston rod 27 of a hydraulic cylinder-piston drive 28, which is guided out against the force of a spring 31 about a rotational axis or bolt 30. The hydraulic cylinder-piston drive 28 is fastened by means of the bolt 30 to a support 29 connected to the movable housing 12, so that the holding element 25 moves with the housing.

It may be mentioned at this point that each bale is usually bound by a plurality of wire loops arranged in planes which are parallel to each other and are spaced apart across the bale. The number of loops depends upon the dimensions of the bale. For the sake of simplicity, however, the binding operation is explained here as though it takes place in only a single binding plane although in practice there are a plurality of such planes spaced apart and each lying parallel to the plane of the drawing of FIG. 1.

Figure 3:
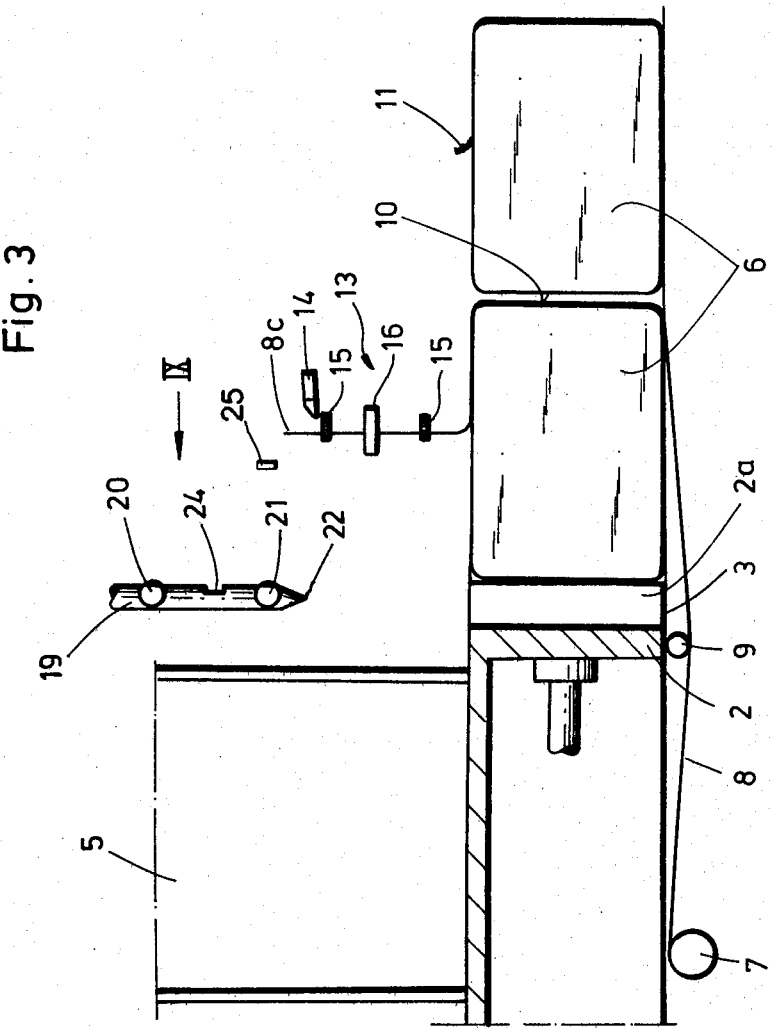
FIGS. 3 to 8 show different stages of a cycle of operation of the machine during binding of a bale.

In FIGS. 3 to 8, in the interests of clearly illustrating the most important parts of the machine, most of the parts of the baling press explained in connection with FIG. 1 are not shown. The above described machine operates as follows:

When, as shown in FIG. 3, the left hand bale 6 of waste paper has just been completely pressed, the pressing plunger 2 is situated in its right hand limiting position, so that a vertical groove 2a formed in the front face of the pressing plunger is aligned with the binding needle 19. The wire 8 pulled from the wire storage roll 7 leads to the right along the lower face, up the front face 10 and to the left along the upper face of the bale 6, before it is deflected upwards approximately at the centre of the length of the bale through 90° to the longitudinal axis of the bale. This wire length which is bent through 90° and later participates in the twisting operation is hereinafter designated as wire length 8c. The wire length 8c is held vertically aligned in the binding plane by the clamping pieces 15 which are fixed to the movable housing 12. The twisting device 13 and the cutting device 14 which are also mounted on the housing 12 and move with it, are situated, when a bale of normal length is produced, in a fixed basic position, as illustrated in FIGS. 1 to 6. The additional wire 8 required during the production of the bale 6 or of a newly produced slab of material 6a, which forms the leading part of an uncompleted bale, is pulled from the wire storage roll 7 as each pressing stroke of the plunger 2 is executed. While this is happening, the twisting device 13 remains stationary in its adopted basic position. In the production of an overlength bale, by contrast, the twisting device 13 on the movable housing 12 leaves its basic position and moves, together with the firmly clamped length of wire 8c, through a distance, which is determined by the quantity of excess material pressed, in the pressing direction P necessary to compensate for the difference in the different bale lengths.

Figure 4:
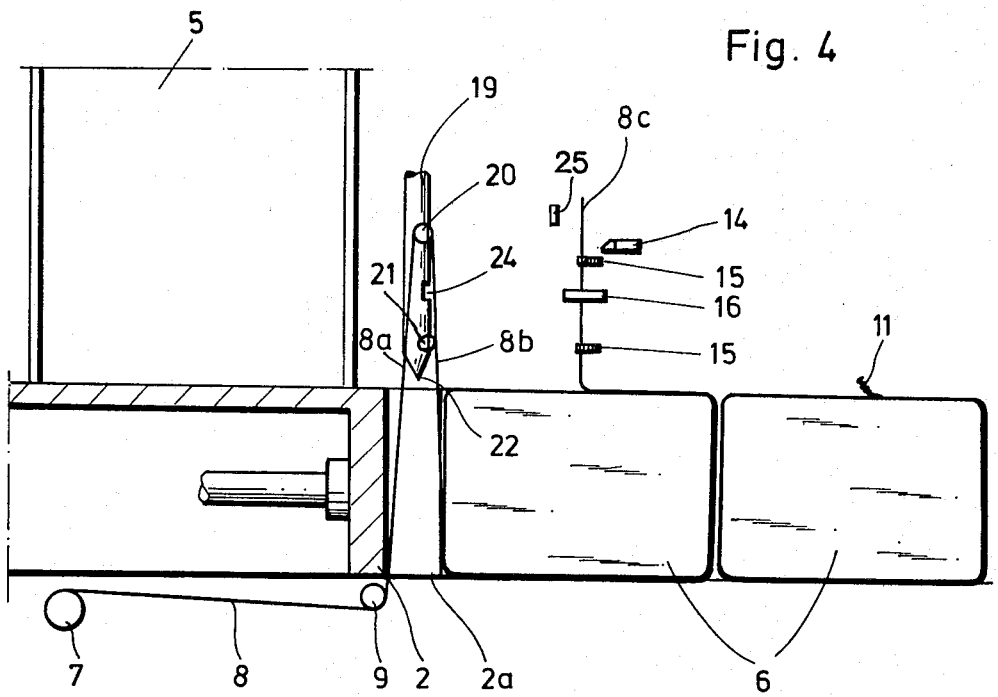

In the position shown in FIG. 4, the binding needle 19 has executed a downward and upward movement and the hook 20 has captured the wire 8 and formed a wire loop consisting of the wire lengths 8a, 8b.

Figure 5:
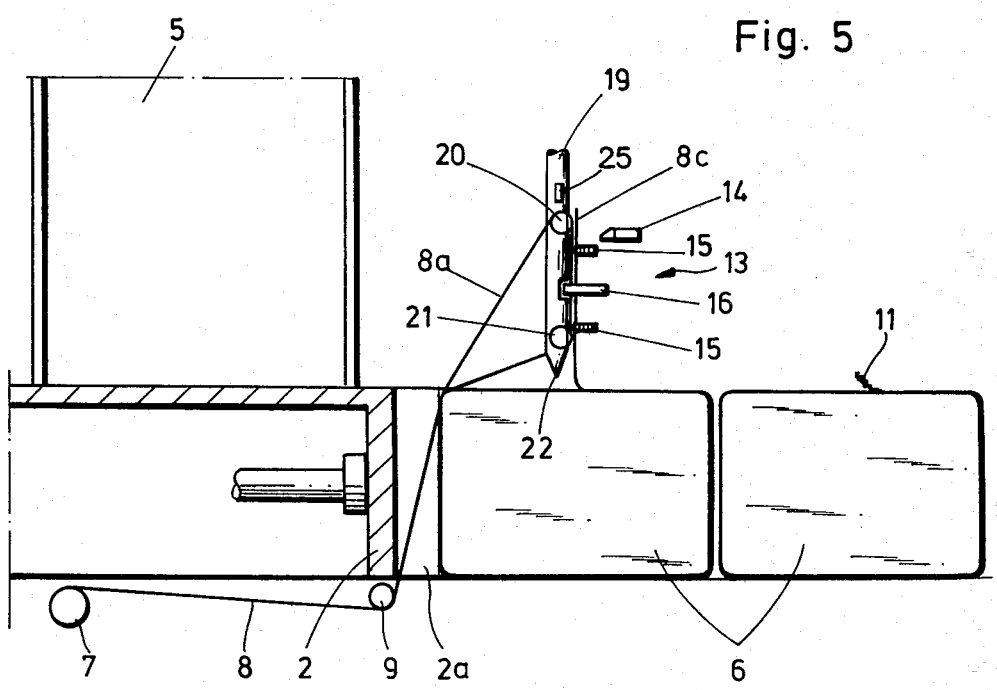

In FIG. 5, the binding needle 19 has moved the loop formed by the wire lengths 8a, 8b, in the pressing direction P up to the position adopted by the twisting device 13. Before the conveyance of the wire over the upper face of the bale, the wire length 8b has centered itself between the hook 20, the lower guide roller 21 and the guide slit 23 formed in the tip of the binding needle 22, so that the wire length 8b can be transported into the twisting position with positive guidance. Moreover, by the guiding of the wire length in this manner, the binding wire 8b nearer to the twisting device 13 is guided, at least in the twisting position, between the hook 20 and the guide roller 21 parallel to the other wire length 8c which is to be joined to it and which is held vertically aligned by the clamping pieces 15, so that the twisting device 13 can seize both the wires 8b and 8c without difficulty. The twisting wheel 16 is moved through the groove 24 formed at the level of the twisting wheel 16 in the binding needle shaft 19, so that a collision between the twisting wheel 16 and the binding needle 19 is avoided.

Figure 6:
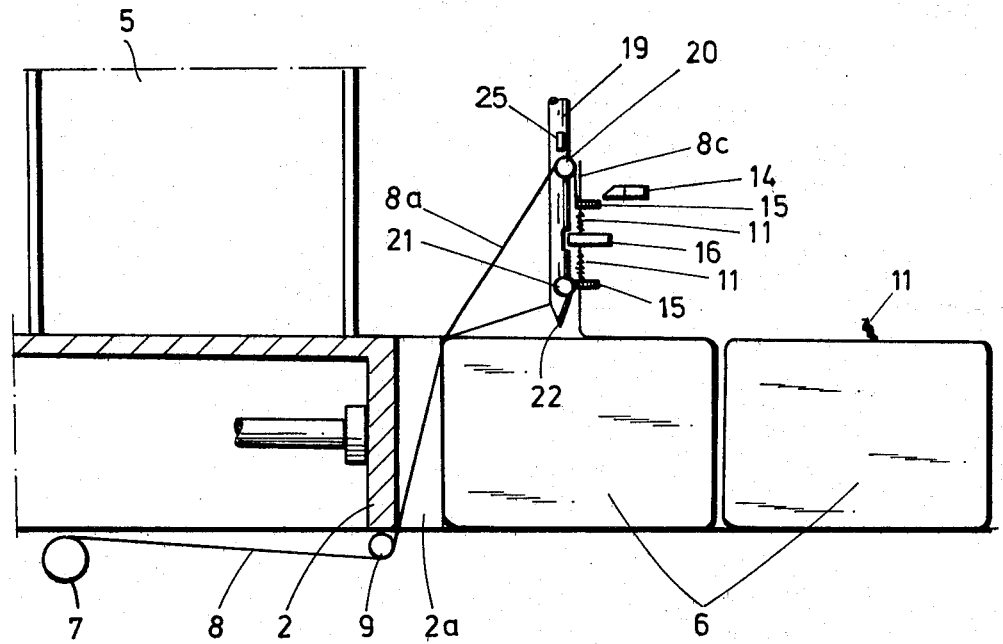

The wire lengths 8b and 8c are then twisted together (see FIG. 6).

Figure 7:
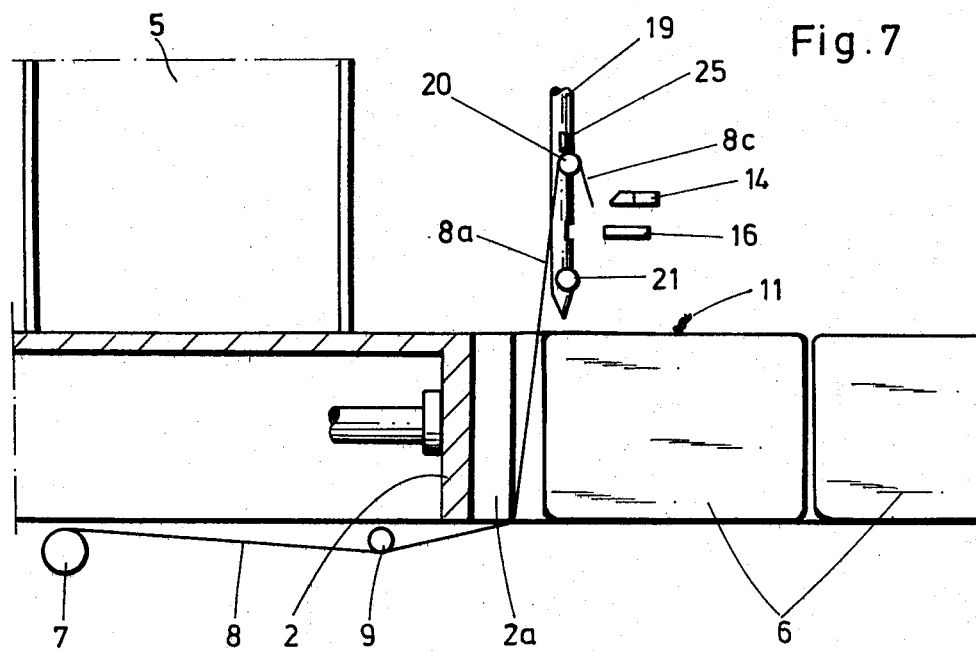

As shown in FIG. 7, after the twisting operation has been completed, the cutting device 14 which is situated above the twisting wheel 16 has cut the twist 11. The upper, cut portion of the wire length 8c still remains hooked in the hook 20 of the binding needle. After cutting of the wire length 8c from the twist 11, the binding needle must, of course, travel upwardly back into the starting position shown in FIG. 3 and the wire length 8a between hook 20 and the roller 9 must be tightened, for example, by a conventional wire magazine which is not shown but is disposed between the guide roller 9 and the storage roll 7. Alternatively the loose wires which may occur must be removed, in order that the same starting conditions shall exist for the next working cycle of the machine to ensure once again functionally reliable operation. In order, during the return movement of the binding needle 19 into the starting position, to prevent the bent length of wire, which rests loosely in the hook 20 from being pulled out from the hook 20, this length of wire is held by the holding element 25, which is mounted above the hook 20 and is hydraulically actuated (see FIG. 7).

As illustrated in FIGS. 10 and 11, the hydraulic cylinder-piston drive 28 is actuated, after the twisting operation is terminated and the wire is cut through, and the piston rod 27 is moved downwardly carrying with it the shoulder piece 26. The shoulder piece 26 accordingly slides along the shaft of the binding needle 19 until it reaches the groove 32 where it engages in the groove, formed in the shaft of the binding needle. The shoulder piece is held against the force of a tensioned spring 31 attached to the support 29. By an additional stroke of the hydraulic cylinder-piston drive 28, or an additional lowering action, the shoulder piece 26 rests on the wire guided in the roller-like hooks 20 and clamps it.

Figure 8:
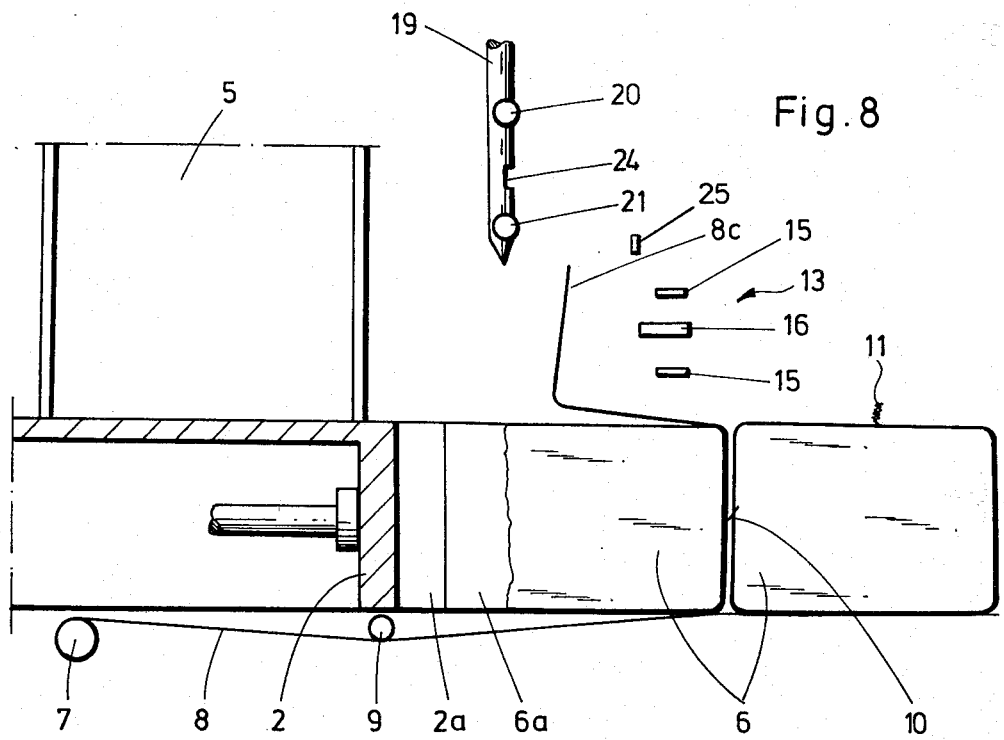
Figure 9:
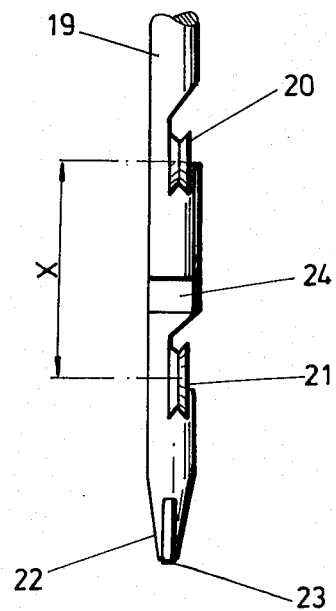
FIG. 9 is a view in the direction of the arrow IX in FIG. 3.

As shown in FIG. 8, the pressing plunger 2 has now executed further working strokes and has pressed a slab 6a of waste material against the wire 8, which passes between the front end face 10 of the new bale and the rear face of the previously pressed bale 6, in order to form a new bale.

The holding element 25 is released and thus the wire length resting on the hook 20 of the binding needle 19 is released. The binding needle 19 is raised by a certain distance (see FIG. 8), so that, owing to this raising of the binding needle 19 and the continuing formation of a new bale 6, the free end 8c of the wire is pulled off the hook 20 of the binding needle 19 and the wire 8 is clamped between the rear face of the preceding bale and the front face 10 of the bale being formed. As soon as the forward, upper edge of the bale being formed has reached the twisting device 13, the free end 8c of the wire kinks with continuing advance of the bale 6 and arrives, due to the positive guidance provided, in the position shown in FIG. 8. The wire end which is cranked through 90° and projects vertically upwards in the binding plane then comes to bear, due to the continued forward movement of the front end of the bale 6, against the clamping pieces 15 and is firmly clamped. As soon as the bale has reached its predetermined length, the new binding operation takes place as already described.

In a similar manner, the binding mechanism of the machine of this invention can also be used, also within the scope of the invention, for a two-wire binding operation. The difference of this from a single-wire binding operation is solely that the initially free end of the wire, which in the preceding description is designated 8c, is drawn from a second wire storage roll instead of from the roll 7, whereas the second wire end, as before, is drawn from a wire storage roll in the same place as the roll 7 in the single-wire binding example shown in the drawings.

I claim:

1. In a machine for pressing bales of refuse and binding said bales with wire, said machine comprising a pressing box, plunger means in said box, means for feeding refuse to said box, means for moving said plunger means in said box to press refuse in said box to form a bale and push said bale from an outlet from said box, the bale has a front face and a rear face with the front face leading when the bale is pushed out of said box and the rear face being pushed by said plunger means and a first surface and an oppositely facing second surface with the first and second surfaces extending in the pressing direction of said plunger means, and a bale binding mechanism, said mechanism including wire supply means for supplying bale binding wire from a rearward position relative to the outlet from said box forwardly in a direction in which said bale is pushed from said box, twisting means for twisting together ends of wire extending around said bale, cutting means for cutting said wire, a binding needle arranged to be reciprocated in a path transverse to said pressing direction, said binding needle being reciprocably movable across the rear face of said bale after said bale has been pushed from said box to form a loop of wire extending across said rear face to a position spaced beyond the first surface of said bale, said loop being formed from wire which extends from said wire supply means along the second surface of said bale and across the front face of said bale, and for conveying wire beyond from said first face opposite to the said pressing direction to a position adjacent said twisting means, the improvement comprising that said binding needle being reciprocally movable together with said loop along a path which is parallel to said pressing direction and is spaced outwardly from said first face to move a portion of said wire in said loop to a position adjacent said twisting means.

2. A machine as claimed in claim 1, further comprising means mounting said twisting means for movement in said pressing direction and means for moving said mounting means and said twisting means.

3. A machine as claimed in claim 1, in which said binding needle includes a hook for holding said wire and wire guide means spaced from said hook, said hook and said guide means being operative together to hold a length of said wire in a position parallel to the direction of reciprocation of said needle in the pressing direction.

4. A machine as claimed in claim 1, wherein said guide means comprises a pulley rotatably mounted on said needle.

5. A machine as claimed in claim 1, in which said needle includes a tip and further comprising means defining a wire guide groove in said tip.

6. A machine as claimed in claim 3, in which a first end of said wire from which said loop is formed extends along a path adjacent said twisting means before said wire extends across said front face of said bale and said hook and said guide means hold said length of said wire parallel to said path of said first end of said wire.

7. A machine as claimed in claim 6, further comprising at least one clamping member for holding said first end of said wire extending along said path.

8. Machine for pressing and binding bales of waste material where the bale has a front face leading in the pressing direction and a rear face trailing in the pressing direction, a first surface and an oppositely facing second surface with the first and second surfaces extending between the front face and the rear face and extending in the pressing direction, especially waste paper, comprising a pressing box, a pressing plunger movable therein, a binding device comprising a cutting and twisting device and comprising a binding needle movable along the rear face of a bale displaced from said pressing box for forming a wire loop extending outwardly beyond the first surface of the bale on which the twisting is to be carried out, the wire being supplied for the loop from a storage roll spaced opposite to the pressing direction from the rear face of the bale when the rear face is displaced from said pressing box and with the wire from which the loop is formed extending along the second surface of the bale and the front face, and an apparatus for longitudinally conveying the wire in the pressing direction into the twisting position, characterized in that the binding needle can be moved together with the wire loop parallel to the pressing direction until opposite the position adopted by the twisting device.

9. In a machine for pressing bales of refuse and binding said bales with wire, said machine comprising a pressing box, plunger means in said box, means for feeding refuse to said box, means for moving said plunger means in said box to press refuse in said box to form a bale and push saad an outlet from said box, the bale has a front face and a rear face with the front face leading when the bale is pushed out of said box and the rear face being pushed by said plunger means and a first surface and an oppositely facing second surface with the first and second surfaces extending in the pressing direction of said plunger means, and a bale binding mechanism, said mechanism including wire supply means for supplying bale binding wire from a rearward position relative to the outlet from said box forwardly in a direction in which said bale is pushed from said box, twisting means for twisting together ends of wire extending around said bale, cutting means for cutting said wire, a binding needle arranged to be reciprocated in a path transverse to said pressing direction, said binding needle being reciprocably movable across the rear face of said bale after said bale has been pushed from said box to form a loop of wire extending across said rear face to a position spaced beyond the first surface of said bale, said loop being formed from wire which extends from said wire supply means along the second surface of said bale and across the front face of said bale, and from said first face opposite to the said pressing direction to a position adjacent said twisting means, the improvement comprising that said binding needle being reciprocably movable together with said loop along a path which is parallel to said pressing direction and is spaced outwardly from said first face to move a portion of said wire in said loop to a position adjacent said twisting means, and said twisting means being movable in the pressing direction between the front face and rear face of the bale so that said twisting means can be located between the front face and rear face of the bale and said binding needle can be moved into position adjacent said twisting means.

10. A machine as claimed in claim 9, wherein said wire supply means comprising a single supply roll of wire so that the bale is bound by a single wire and has a single twisting location on each bale.

* * * * *

UNITED STATES PATENT AND TRADEMARK OFFICE
CERTIFICATE OF CORRECTION

PATENT NO. : 4,466,345
DATED : Aug. 21, 1984
INVENTOR(S) : Erwin Kaltenbach

It is certified that error appears in the above-identified patent and that said Letters Patent is hereby corrected as shown below:

In the heading of the Patent it should read:

[22]  Filed:  -- Dec. 30, 1982 --.

Signed and Sealed this

Nineteenth Day of February 1985

[SEAL]

Attest:

DONALD J. QUIGG

*Attesting Officer*  *Acting Commissioner of Patents and Trademarks*